Nov. 10, 1931.  J. B. HENDERSON  1,831,598

GYROCOMPASS

Filed March 7, 1924

Inventor
James B. Henderson
By Mosley and Gill
Attorneys

Patented Nov. 10, 1931

1,831,598

UNITED STATES PATENT OFFICE

JAMES BLACKLOCK HENDERSON, OF BLACKHEATH, ENGLAND

GYROCOMPASS

Application filed March 7, 1924, Serial No. 697,474, and in Great Britain March 7, 1923.

My invention relates to gyro-compasses of the usual type and has for its object the elimination of the oscillation of the compass which takes place subsequent to any change of course or speed of the ship, such oscillation being due to ballistic effects produced by the change of course or speed. During an N-S acceleration, for example, the gyroscope acquires a tilt of the rotor axis if the damping is produced by torques about the vertical, and this tilt introduces an oscillation of the compass. Or during a turn when the compass is tilted in the E-W plane due to centrifugal force and simultaneously accelerated in the N-S direction, the gravity control produces a tilt about the inclined trunnion axis which has a component in the vertical plane and an oscillation about the meridian results.

In my present invention I eliminate the ballistic effects by employing a level control as described in my co-pending application Serial No. 313,537, filed July 26, 1919, and arranging the viscosity of the fluid in the level and the throttling so that the displacement of fluid produced by the acceleration changes slowly and is approximately proportional to the change of velocity in the N-S direction. I thus prevent ballistic deflection of the compass from taking place and by increasing the damping coefficient I arrange the subsequent movement of the compass towards the new virtual meridian to be heavily damped and preferably dead-beat. I keep the gravity control of the gyroscope approximately the same as usual or I may even increase it.

More specifically the ballistic oscillation temporarily destroys the accuracy of the compass and I have already devised several methods of overcoming this defect. In my prior application Serial No. 427,424, filed November 30, 1920 for gyroscopic instruments and apparatus, I described a compass so controlled that it seeks its zero in azimuth slowly in a precession whose velocity is proportional to the deviation of the gyroscope from its zero. When the zero shifts from the real to the virtual meridian I apply a compensation so that the compass and its follower seek this new zero in the same slow fashion without ballistic deflection and I adjust the compass card relatively to the follower so that when the rotor axis is on the virtual meridian the zero of the card is on the real meridian. I also described how a periodic compass subject to ballistic deflection in azimuth and in tilt can be compensated by an adjustment of the gravity control system relatively to the gyro so that when the gyro is deflected ballistically to the virtual meridian and tilted, the adjustment annuls the gravity torque which would otherwise be produced by the tilt, so that the subsequent oscillation is prevented. In that case also I adjust the compass card relatively to the follower so as to indicate the ship's bearing relatively to the real meridian.

In the later Patent No. 1,671,583, granted May 29, 1928 for gyro navigational apparatus, I have described another method of dealing with this same problem. Therein, by controlling the compass by means of a level sufficiently throttled to make the ballistic displacement of fluid during an acceleration proportional to the velocity acquired, and not proportional to the acceleration, the gyroscope is not deflected ballistically during the acceleration, and I introduce at the same time an adjustment of the level and of an external torque mechanism so that, in the first place, the level is tilted relatively to the gyroscope to prevent any return flow of the displaced fluid and, secondly, torques are applied (1) about the horizontal axis to annul the gravity torque due to the displaced fluid so as to prevent precession to the virtual meridian and (2) about the vertical axis to keep the rotor axis horizontal despite its displacement in azimuth from the new zero on the virtual meridian.

The present invention comprises still another method of dealing with the same problem. The mechanism used is practically the same as that used in the invention described in Patent No. 1,671,583 except that the external torque mechanism is omitted. There is therefore nothing to prevent the compass from precessing to the virtual meridian but the throttled level prevents ballistic deflection in azimuth and ballistic tilt during the acceleration. By a particular arrangement of the constants of the compass and level, however, I arrange that the precession of the gyroscope to the virtual meridian following a change of speed or course is an aperiodic, non-oscillatory movement by which the deviation from the virtual meridian is reduced by equal percentage decrements in equal intervals of time, even though the ordinary movement of the compass at other times is a periodic oscillation. Then, to prevent this movement of the compass from being transmitted to other mechanisms requiring a fixed zero in azimuth, I apply mechanically to one of the contacts by which the follower and the external transmissions are controlled, an equal and similar displacement at the same rate as the precession of the gyroscope. The compass card may be carried on the follower to indicate the real meridian, or on the gyroscope to indicate the virtual meridian, or it may be mounted on the follower and displaced relatively thereto along with the moving contact so as to indicate the virtual meridian.

Since there is no ballistic tilt of the gyroscope there is no necessity to keep the damping torque small, as is ordinarily done to minimize the oscillation due to ballistic tilt, and as increased damping effects quicker settlement of the compass, I preferably increase the damping to considerably more than has customarily been used in the past. I keep the gravity control approximately the same as before, or I may increase it as well as the damping, thus shortening the period of the compass. The 85 minute period heretofore usually employed in a gyro compass has been dictated solely by the requirement of a correct ballistic deflection in azimuth, so that where there is no ballistic deflection, as in the present invention, the necessity to preserve an 85 minute period disappears.

Fig. 3 shows in three diagrams numbered (a), (b) and (c) three curves explaining the movement of the compass herein described in comparison with compasses previously invented.

Figure 1:
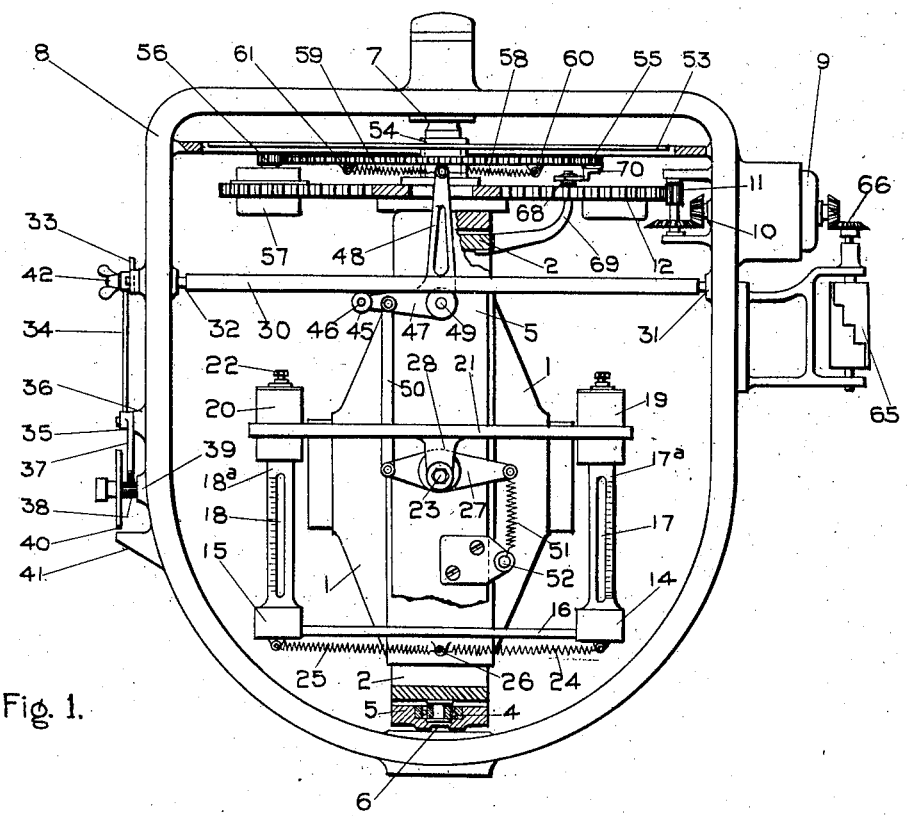
Fig. 1 shows a side elevation in part section of a gyro-compass embodying my invention.

The gyroscope in its case 1 is mounted upon horizontal trunnions in the vertical gimbal ring 2 which is pivoted on vertical trunnions 4 in the vertical follow-up ring 5 which is pivoted on vertical trunnions 6 and 7 in the frame 8 which is suspended in the compass binnacle in the usual manner. The follow-up ring 5 is driven by the follow-up motor 9 through the bevel gears 10, spur pinion 11 and circular rack 12 which is rigidly fixed to the ring 5. The motor 9 is controlled by a contact mechanism between the rings 2 and 5 so that the ring 5 follows the azimuthal motion of the gyroscope 1 in the usual manner.

I impart gravity control to the gyroscope by means of a level, as described in my copending application Serial No. 313,537. The level consists of two mercury vessels 14 and 15 connected by a tube 16. The vessels are closed at the tops and glass tubes 17 and 18, protected by brass covers 17a and 18a, connect them with two vessels 19 and 20 which are connected by a frame 21. The object of the glass tubes 17 and 18 is to provide a sensitive detector of the displacement of the mercury and a means of regulating and measuring its rate of flow.

The mercury half fills each of the vessels 14 and 15 and a light fluid fills the remainder of 14 and also about half the glass tube 17. The same or another light fluid is poured into 20 until it fills the top half of 15, the whole of 18 and the lower half of 20. A throttle valve at the bottom of 20 closed by the screw 22 serves to adjust the rate of flow of the mercury and the superposed light fluid and the meniscus in tube 17 serves as an indicator of the displacement of the fluid. I may employ two light fluids which do not mix in tube 17, their surface of separation serving as the indicator in a manner well-known in sensitive differential manometers.

The frame 21 carrying the level is pivoted on horizontal trunnions 23 on the follow-up ring 5, these trunnions being normally coaxial with the horizontal trunnions upon which the gyroscope 1 is supported in the vertical ring 2. The level is connected by two springs 24, 25 to a pin 26 fixed to the gyroscope case at a point eccentric to the vertical trunnions. These springs may be made rigid connectors, but I prefer to have them flexible because the flexibility reduces the sizes of the mercury vessels required and the motion of the level relatively to the gyroscope provides a sensitive indicator of the displacement of the fluid which I may use instead of, or in addition to, the glass tubes 17 and 18 and the light fluid.

One or both of the trunnions 23 is fitted with an adjustment parallel to the gyro rotor axis. The trunnion 23 is carried by a lever 27 pivoted on the eccentric sheaf 28 which is attached to the follow-up ring 5.

Any small angular motion of the lever 27 around the sheaf 28 moves the trunnion 23 through a small displacement parallel to the gyro rotor axis and produces a tilt of the level frame 21.

Figure 2:
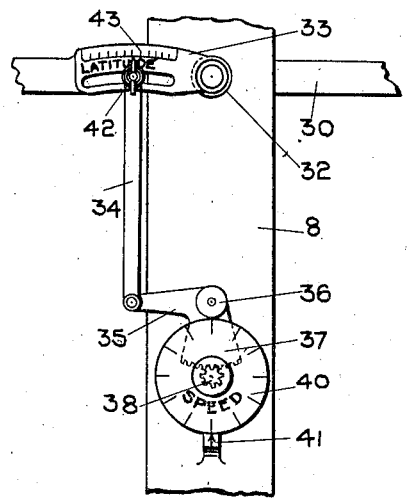
Fig. 2 illustrates the speed correction adjustment.

The frame 8 carries a circular ring 30 called the "cosine" ring pivoted upon trunnions 31 and 32 about which it can be oscillated by a crank 33 connected by a link 34 (Fig. 2) to another crank 35 pivoted on a pin 36 fixed to the frame 8. The crank 35 has a spur sector 37 fixed to it which gears with a spur pinion 38 pivoted on a pin 39 on the frame 8. The pinion 38 carries the speed scale on a circular dial 40 which is set relatively to the fixed indicator 41. The upper end of the link 34 is pivoted on a crank pin 42 which is adjustable relatively to the crank 33 along a scale of latitude 43 engraved on this crank. I arrange the gear ratios and linkage so that when the speed is set on dial 40 and the latitude on scale 43 the tilt of the ring 30 is proportional to the speed of the ship divided by the cosine of the latitude.

The ring 30 contacts with a roller 45 mounted upon the crank pin 46 on the horizontal crank 47 of a bell crank 47—48 pivoted on an axle 49 on the follow-up element 5. The crank 47 is connected with the lever 27 by a connecting rod 50 and the roller 45 is kept in contact with the cosine ring 30 by a tension spring 51 interposed between the lever 27 and a fixture 52 on the follower 5. The vertical arm 48 of the bell crank passes through a hole in the follow-up ring 12 and is used to displace the compass card 53 relatively to the follow-up element 5, on which it is pivotally mounted on a bearing 54. The card is rigidly connected to the circular toothed wheel 55 which gears with a pinion 56 driving the rotor of a viscous brake 57 carried by the circular rack 12. The wheel 55 is connected with the upper end of the vertical crank 48 by two springs 58 and 59 and two cleats 60 and 61 fixed to the wheel.

When the crank 48 is displaced from the vertical by the engagement of the roller 45 with the cosine ring 30, the compass card would immediately partake of a corresponding displacement because of the spring connection 58—59 but is prevented from following immediately by the resistance of the viscous brake 57. It then proceeds to follow the crank at a rate proportional to the force imparted by the springs. It thus follows the crank according to a logarithmic law, the lag being reduced in constant geometric rate in equal intervals of time. The displacement of the bell crank 47—48 is obviously proportional to the component speed of the ship along the meridian divided by the cosine of the latitude and is designed so that the angular displacement of the point of attachment of the springs to the crank 48 around the vertical axis of the compass is equal to the deviation of the virtual from the true meridian.

As the component correction proportional to the ship's heading in azimuth is provided by the position of the roller 45 on the cosine ring 30, and must be a maximum, positive or negative, when the ship is steaming N–S and zero when the ship is on an E–W course, the roller 45 must be in line with the pivot axis of the cosine ring when the ship is heading E. or W. The pivots 31 and 32 must therefore, in a compass designed as shown, be offset from the fore-and-aft line of the binnacle by an amount equal to the distance by which the axis 46 of the roller 45 is offset from the vertical central plane of the follow-up ring 5. In Fig. 1, in which the rotor axis and the trunnion axis 31—32 lie in the plane of the paper, if the left side of the gyro be taken as the N. side, the illustration represents the compass as viewed from the west on a ship heading approximately N. 20° W. An obvious alternative is to pivot the ring 30 on the fore-and-aft and offset the axis 49 on the ring 5, so as to bring the axis pin 46 into the central plane of the ring 5.

I must refer to the theory underlying the action of this compass to explain its action. With no throttling of the fluid in the level the compass behaves exactly like one having its gyroscope loaded at the top, and is stable if the rotor is turning in a counter-clockwise direction looking north. The viscosity and throttling introduce very important and valuable changes, the first of which is that the customary ballistic deviation of the compass proportional to the change of speed along the meridian does not take place but a displacement of fluid in the level takes place which later causes the gyroscope to precess slowly towards the new virtual meridian. The motion of the compass becomes also more complicated because the periodic equation which in the normal compass is quadratic, becomes cubic. There is therefore always one real root to this equation. I find by mathematical analysis that the changes introduced by a change of course, and the damping out of the same during the subsequent motion towards the new virtual meridian, can be made to be dependent upon this real root and independent of the other roots, real or imaginary, under certain conditions which determine the constants of the compass. The motion towards the new virtual meridian is then represented by the logarithmic law $\theta = \theta_0 e^{-p_1 r}$, the displacement of the level relatively to the gyro or of fluid in the level by $\epsilon = \epsilon_0 e^{-p_1 r}$ and the tilt of the gyroscope by $\phi = \phi_0 e^{-p_1 r}$ in which $\theta_0$ is the displacement of the virtual meridian, $\epsilon_0$ the ballistic displacement of the level and $\phi_0$ the ballistic tilt of the gyroscope, all produced by the change of course, and $p_1$ is the real root of the periodic equation. There is no ballistic tilt of the gyroscope produced by change of course and to satisfy the equation I produce the mechanical equivalent by displacing the level relatively to the gyroscope by moving the trunnion 23 by means of the cosine ring 30 and the eccentric sheaf 28, as described above.

I arrange the viscous resistance of the brake 57 so that the compass card follows the motion $\theta = \theta_0 e^{-p_1 r}$ and the indication of the compass is therefore left unaltered thereby.

The physical meaning of the real root referred to above is that the oscillatory motion of the compass which, with an unthrottled level, would take place about the virtual meridian as zero, with the throttled level takes place about a zero which moves towards the virtual meridian according to an exponential law of equal percentage decrements in equal intervals of time. The amplitude of oscillation depends on the initial conditions of fluid displacement and of deviation and tilt of the gyroscope, but for certain ratios between these three factors the periodic oscillation vanishes and only the exponential precession towards the virtual meridian remains. In normal circumstances of disturbance the initial conditions are unknown, but in cases of change of course or speed the initial conditions are known or can be controlled, and my invention involves a particular arrangement of the constants of the compass so that in these known conditions the displacements from a final steady state of the virtual meridian, which occur after every change of speed and course, shall be in the required ratio to eliminate the periodic oscillation and leave only the aperiodic precession of the compass to the new virtual meridian. The required ratios can be obtained in any compass experimentally, or they can be produced in symbols by the conventional mathematical method of substituting in the equation of motion of the compass the three values already given, viz. $\theta = \theta_0 e^{-p_1 t}$, $\phi = \phi_0 e^{-p_1 t}$ and $\epsilon = \epsilon_0 e^{-p_1 t}$.

The transmitter 65 is driven through bevel gears 66 by the motor 9 and serves to actuate the repeater compasses, but to prevent the slow motion in azimuth introduced by a change of course from being transmitted I mount the roller contact controlling the motor 9 upon the sensitive ring 2 as usual, but the two-part commutator 70, I fix to the toothed wheel 55 instead of to the follow-up ring 12 as is usual. The roller contact 68 is shown in Fig. 1 supported from the ring 2 on a bracket 69 and bearing upon the two-part commutator 70 fixed to the wheel 55.

The result of this arrangement is that as the gyro deviates slowly to the virtual meridian it is accompanied at the same rate by the ring 55 and compass card 53, the roller 68 therefore remaining throughout in contact with the insulation dividing the two contact segments of the commutator 70. No motion is therefore caused in the follow-up motor 9, transmitter 65, follow-up element 5 or the repeater compasses controlled by the transmitter 65. That is to say, the gyroscope deviates slowly to the virtual meridian, while the element 5 and repeater compasses will remain on the real meridian. During the movement of the gyroscope neither the gyroscope nor the card, if the latter be mounted as shown, would accurately indicate the ship's heading in relation to either the real or virtual meridians, but the repeater compasses will consistently indicate the heading in relation to the real meridian. It will be evident that the compass card, per se, has nothing to do with the compensation of the repeater compass. That compensation is effected solely by the movement of the commutator 70 and I have adopted the embodiment shown simply for the simplicity of illustration. The card could equally well be mounted on the sensitive element in order to indicate the virtual meridian, or on the follow-up element 5 to indicate the true meridian. The relative displacement between the sensitive and follow-up elements produces a small phase difference between the follow-up element 5 and the gyro which would impose a persistent torque on the latter by twisting the filar by which it is suspended from the follow-up element. To obviate this I either employ a neutral suspension or else I attach to the ring 55 the torsion head to which the upper end of the usual filar is attached. The follow-up element 12, it will be noticed, will indicate the true meridian although the gyro lies on the virtual meridian. If it is desired that the master compass card should indicate the real meridian as well as the repeaters which are responsive to the transmitter 65, it is only necessary to mount the card 53 on the ring 12 instead of on the ring 55. A pointer on the ring 55 would then indicate on the compass card the deviation of the virtual meridian.

I may set the indication of the speed dial 40 automatically from the ship's log by means of a receiver motor and an electrical transmission system controlled by the log.

I may make adjustments to the viscous brake 57 to vary the viscous torque so as to compensate the effects of varying temperature and of the variation of latitude on the damping coefficient $p_1$.

I claim:—

1. In a gyro-compass for use on a craft, the combination of a frame fixed to the craft, a gyroscope movably mounted in the frame, a follow-up element for the gyroscope, a compass card movably mounted on the follow-up element, a member mounted on the frame, means for displacing the member in accordance with the speed of the craft and a function of its latitude, a member mounted on the follow-up element and coacting with the first-named member to receive a displacement proportional to the meridional component of the speed of the craft and a function of its latitude, yielding connections between the second-named member and the card and a viscous brake device between the follow-up element and the card for causing the card to follow the member according to a logarithmic law.

2. In a gyro compass for use on a craft, the combination of a gyroscope, a follow-up mechanism for the gyroscope, means for actuating the follow-up mechanism, an electrical contact associated with the gyroscope, a second co-operating contact movably mounted on said follow-up mechanism, said contacts controlling the actuating means to control the movement of said follow-up mechanism in azimuth, mechanism actuated in accordance with changes in the meridional component of the speed of the craft, and connections between the last-named mechanism and said second contact for displacing the latter relatively to the follow-up mechanism in order to maintain said follow-up mechanism on the real meridian when the gyroscope deviates to the virtual meridian as a result of said changes.

3. In a gyro compass for use on a craft, the combination of a gyroscope, a follow-up mechanism for the gyroscope, means for actuating the follow-up mechanism, co-operating contact elements associated with the gyroscope and the follow-up mechanism respectively for controlling the actuating means, mechanism actuated in accordance with changes in the meridional component of the speed of the craft and connections between the last-named mechanism and the contact element associated with the follow-up mechanism for moving it in accordance with the amount of deviation of the virtual meridian.

4. In a gyro compass for use on a craft, the combination of a gyroscope, a follow-up system on which the gyroscope is mounted, a gravity control device movably mounted on the follow-up system and connected to the gyroscope for imparting directive power to the gyroscope to cause it to seek a zero position on the meridian when stationary, mechanism actuable in accordance with changes in the course or speed of the craft and connections between the device and the mechanism for actuating the gravity control device to cause the gyroscope to shift its zero position from the real to virtual meridian according to a logarithmic law.

5. In a gyro compass for use on a craft, the combination of a gyroscope, a follow-up system on which the gyroscope is mounted, a compass card movably mounted on the follow-up system, mechanism actuable in accordance with the meridional component of the speed of the craft and means actuated by said mechanism and including a viscous resistance device and a resilient member for imparting relative adjustment between the card and the follow-up system in accordance with a simple logarithmic law to eliminate deviation produced by changes in course or speed of the craft.

6. In a gyro-compass for use on a craft, the combination of a frame, a gyroscope, a follow-up element for the gyroscope mounted on the frame, a compass card movably mounted on the follow-up element, a member mounted on the follow-up element, means for actuating the member in accordance with meridional components of the speed of the craft and a function of the latitude, yielding connections between the member and the card and a viscous brake device between the follow-up element and the card for causing the card to follow the member according to a logarithmic law.

7. In a gyro compass for use on a craft, the combination of a gyroscope, a follow-up system on which the gyroscope is mounted, a level movably mounted on the follow-up system and having a restricted passage and containing a liquid, connections between the gyroscope and the level, mechanism actuable in accordance with changes in the meridional component of the speed of the craft and a connection between said mechanism and level for adjusting the level relatively to the gyroscope in accordance with such changes to cause the gyroscope to precess to the new virtual meridian according to a simple logarithmic law.

8. In a gyro compass for use on a craft, the combination of a gyroscope, a follow-up mechanism adapted to follow the movements of the gyroscope in azimuth, an element associated with said follow-up mechanism for controlling its follow-up movement, and means actuable in accordance with changes in the meridional component speed of the craft for displacing said element relatively to the follow-up mechanism to prevent the follow-up mechanism from following the movements in azimuth of the gyroscope produced by said changes.

9. In a gyro compass for use on a craft, the combination of a gyroscope, a follow-up mechanism for the gyroscope, a member movably mounted on the follow-up mechanism, a compass card mounted on the member, means actuable in accordance with changes in the meridional component of the speed of the craft, a liquid level torque applying device for the gyroscope for causing it to precess to the virtual meridian, connections between the means and the device for adjusting the latter to control the precession of the gyroscope and connections between the means and the member including a viscous resistance device and a resilient member for producing relative movement between the follow-up mechanism and the member movably mounted thereon in accordance with the movement of the gyroscope.

10. In a gyro compass for use on a craft, the combination of a gyroscope, a follow-up mechanism for the gyroscope, an adjustable mechanism attached to said follow-up mechanism adjustable in accordance with changes in course or speed of the craft and including a member carrying one of a pair of co-operating electrical contacts by which said follow-up mechanism is controlled relatively to the gyroscope, a viscous resistance device connecting the follow-up mechanism to the member, and a resilient connection between the member and the adjustable mechanism for moving the contact slowly relatively to the follow-up mechanism in order to produce a gradual deviation between the follow-up mechanism and the gyroscope.

11. In a gyro compass for use on a craft, the combination of a gyroscope, a follow-up system on which the gyroscope is mounted, an element mounted on the follow-up system and adapted to fix the relative position of the follow-up system and gyroscope in azimuth, mechanism actuable in accordance with changes in the azimuthal deviation of the virtual meridian from the real meridian due to movements of the craft, and connections between said mechanism and element for displacing the element relatively to the follow-up system so as to produce a deviation between the follow-up system and gyroscope equal to the deviation of the virtual meridian from the real meridian.

12. In a gyro compass for use on a craft, the combination of a gyroscope, a follow-up system for the gyroscope, a member displaceable relatively to the follow-up system by an amount proportional to the difference in azimuth between the real and virtual meridians, a compass card carried by the system and means to displace the card slowly relatively to the follow-up system by the amount of said difference in azimuth, said means comprising a spring connection between the member and card and a viscous brake connecting the card to the system.

13. In a gyro compass for use on a craft, the combination of a gyroscope, a follow-up system on which the gyroscope is mounted, a member movably mounted on the follow-up system and actuable in accordance with changes in the meridional component speed of the craft, a torque-applying device associated with the gyroscope for producing precession thereof, a connection between the member and device for shifting the device relatively to the gyroscope proportionally to said changes to cause precession of the gyroscope to the virtual meridian according to a logarithmic law, an element for indicating the azimuth of the gyroscope relatively to the craft, an elastic connection between the member and element for displacing the element in azimuth by the amount of deviation of the virtual meridian, and a yielding brake device adapted to resist said movement of the element so that the element is moved in azimuth according to a logarithmic law by the amount of the deviation of the virtual meridian due to said changes.

14. In a gyro compass for use on a craft, the combination of a gyroscope, a follow-up system on which the gyroscope is mounted, an element adjustably mounted on the follow-up system, a torque-producing level device connected to the gyroscope and element and adapted to cause the gyroscope to oscillate periodically about a zero in azimuth, a mechanism actuable in accordance with changes in the meridional component speed of the craft, and a connection between said mechanism and element for shifting the device relatively to the gyroscope to cause the gyroscope to precess to the virtual meridian according to a logarithmic law.

15. In a gyro compass for use on a craft, the combination of a gyroscope, a follow-up system for the gyroscope, a mechanism actuable in accordance with changes in the meridional component speed of the craft, means for controlling the follow-up system including a contact element carried by the gyroscope and a second contact element adjustably mounted on the follow-up system, an elastic connection between the mechanism and adjustable contact element for moving the latter relatively to the follow-up system in accordance with the difference in azimuth between the real and virtual meridians, and a yielding brake device resisting said displacement of the adjustable contact element so that the said adjustable contact element is displaced slowly relatively to the follow-up system by the amount of deviation of the virtual meridian.

JAMES BLACKLOCK HENDERSON.